US006038760A

United States Patent [19]

Antoine et al.

[11] Patent Number: 6,038,760

[45] Date of Patent: Mar. 21, 2000

[54] METHOD FOR MAKING AN INDUCTOR

[75] Inventors: Dominique Antoine, Clauris; Dominique Hantz, Comimont, both of France

[73] Assignee: Seb S.A., Ecully, France

[21] Appl. No.: 08/776,312

[22] PCT Filed: Jul. 24, 1995

[86] PCT No.: PCT/FR95/00989

§ 371 Date: Jan. 29, 1997

§ 102(e) Date: Jan. 29, 1997

[87] PCT Pub. No.: WO96/04767

PCT Pub. Date: Feb. 15, 1996

[30] Foreign Application Priority Data

Jul. 29, 1997 [FR] France .................................. 94 09670

[51] Int. Cl.[7] ...................................................... H01F 41/06

[52] U.S. Cl. ........................ 29/605; 219/676; 264/272.19

[58] Field of Search .............................. 29/605; 219/675, 219/676; 264/272.19

[56] References Cited

U.S. PATENT DOCUMENTS

| | | | |
|---|---|---|---|
| 4,547,962 | 10/1985 | deWalle et al. | 264/272.19 |
| 4,629,843 | 12/1986 | Kato et al. . | |
| 4,770,355 | 9/1988 | Mori et al. | 29/605 X |
| 4,833,774 | 5/1989 | Jacob-Grinschgl et al. | 29/604 |
| 5,197,180 | 3/1993 | Mihalko | 29/605 X |

FOREIGN PATENT DOCUMENTS

| | | |
|---|---|---|
| 0 158 353 | 10/1985 | European Pat. Off. . |
| 2 309109 | 11/1976 | France . |

OTHER PUBLICATIONS

Patent Abstracts of Japan, vol. 018, No. 324 (E–1564) Jun. 20, 1994 & JP A 06 076931.

Patent Abstracts of Japan, vol. 004, No. 162 (E–033) Nov. 12, 1980 & JP A 55 110021.

*Primary Examiner*—Carl E. Hall

*Attorney, Agent, or Firm*—Pillsbury Madison & Sutro

[57] ABSTRACT

A method for forming electrical wires into flat coils for use in inductive devices wherein a rapid setting cement is used to maintain the wound wires prior to encapsulation thereof.

11 Claims, 1 Drawing Sheet

1 2 8 5 6 5a x x' 6 10 10

METHOD FOR MAKING AN INDUCTOR

TECHNICAL FIELD

The present invention relates to the field of fabrication of inductors and in particular fabrication of flat coils or windings of electric wires intended for the production of induction sources, for example utilized for the cooking of foodstuffs.

PRIOR ART

It is already known in the prior art to produce such flat windings by utilizing electric wires which are coated with a thermo-adhesive layer. When the winding is completed, an electric current passes through the electric wire in order to heat it and thus procure an adherence of each winding with, on the one hand, an adjacent winding and, on the other hand, with its support. The rigid assembly can then be easily handled without risk of undoing the successive windings. Such a maintenance operation precedes in general an encapsulating operation in which the assembly constituted notably by the winding is impregnated with a resin the purpose of which is to assure the final and homogeneous maintenance of the assembly. The use of such a technique is burdensome and costly because the electrically isolated electrical wire is coated with a supplementary thermo-adhesive layer after having been traversed by an electric current. All of these operations result in a fabrication process which is costly and complicated.

SUMMARY OF THE INVENTION

The object of the present invention is to provide a fabrication process for windings of electrical wires or flat coils for the production of inductors permitting manipulation after the winding operation of, as well as an inductor, said windings with their support without risking undoing or harming the compactness of said windings.

Another object of the present invention is to utilize retention means which are inexpensive and whose utilization is extremely simple in order to assure a provisional retention of the windings on their support before an encapsulating operation, which is intended to assure a definitive retention.

The objects according to the present invention are achieved with the aid of a process for fabricating an inductor for induction sources consisting in winding on a support an electric conductor coated with an electrically isolating material and utilizing a resin to maintain the windings obtained in a compact form after an encapsulating operation, characterized in that it consists of:

utilizing a rapid-setting cementing means to maintain the windings (10) on their support (5) before the baking operation.

The objects of the present invention are equally achieved with the aid of an inductor for an induction source comprising a support on which is wound a series of windings coated with an electrical insulation material characterized in that openings are arranged in the support opposite the windings to permit the passage of cementing means assuring the retention of the windings on the support.

BRIEF DESCRIPTION OF THE DRAWINGS

The characteristics and advantages of the invention will appear more clearly from a reading of the description given hereafter with reference to the attached drawings given by way of non-limiting examples in which.

BEST MANNER OF CARRYING OUT THE INVENTION

Figure 1:
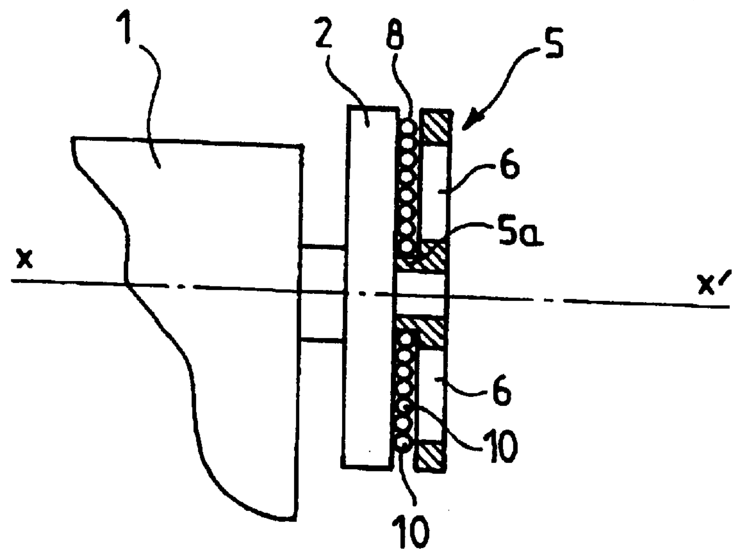
FIG. 1 represents a partial view in cross-section of the winding and its support mounted on a winding device utilized in the process according to the invention.

The process according to the invention is performed with the aid of a lathe 1, furnished with a chuck 2, which are shown in FIG. 1. The chuck 2 presents an appropriate configuration to permit the mounting of a support 5 on which will be effectuated the windings 10 of wires that constitute an inductor. The support 5 is for example a disc having on its rear face and in its central part a flange 5*a* intended to be introduced into the chuck 2 and to serve as a base to support the first of the windings 10. The support 5 is supported by its flange 5*a* against the chuck 2 and thus creates a space 8 between said chuck 2 and the rear face of the support 5 in order to accommodate therein the windings 10. The windings 10 are constituted by electric wires coated with an electrical insulation layer. The support 5 equally presents openings 6 arranged in the disc and produced in the form of radial slots for example, and facing windings 10.

Advantageously, the support 5 presents at least two openings 6 distributed for example in a symmetrical manner with respect to an axis x–x' representing the mounting axis of the support 5 on the chuck 2 as well as the axis of rotation of the lathe 1.

Figure 2:
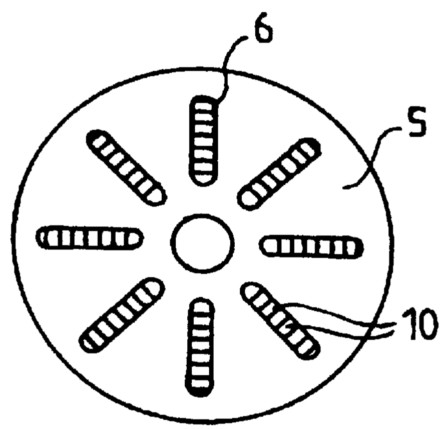
FIG. 2 represents a front view of a support utilized in the process according to the invention.

FIG. 2 shows an example of the structure of the support 5 furnished with eight openings 6 distributed angularly in a regular manner on the support 5 around its axis x–x'. The openings 6 permit direct access to portions of the windings 10 distributed on the rear face of the support 5. The openings 6 advantageously present a longitudinal form, of rectangular type. According to a variation of the structure of the openings 6, these latters are realized by bores.

The process of fabrication of the inductor according to the present invention thus consists in utilizing a rapid-setting cementing means to maintain the windings 10 on their support 5 before the baking operation. This latter consists in effect in impregnating the windings 10 effectuated on the support 5 with a material of the resin type permitting to maintain a definitive retention of said windings 10 against one another on the support 5. During this encapsulating operation the assembly constituted by the support 5 and the windings 10 is for example immersed in a tank containing a resin of the electric winding impregnation resin type.

It is thus important during fabrication of the inductor that the windings 10 remain intimately bound to the support 5 when this latter is disengaged from the chuck 2 in order to proceed with the encapsulating operation. Thus the process according to the invention consists in introducing cementing means into the openings 6 arranged in the support 5. These cementing means thus constitute provisional retention means before the encapsulating operation permitting the formation of a rigid and compact assembly formed of the windings 10 and the support 5. The assembly thus constituted can thus be handled and oriented in all directions without separating the windings 10 from the support 5. Another use of the rapid-setting cementing means permits almost instantaneous separation of the support 5 associated with the windings 10 from the chuck 2 without the delay of a possible drying time of a resin projected on the windings 10 and the support 5 or a coating covering the wound electric wire, as is the case in the known processes for producing inductors.

The process according to the invention consists in utilizing a rapid-setting cement as the cementing means. The rapid-setting cement, not shown in the figures, is in this case introduced into the openings 6 and comes in contact, on the one hand, with the windings 10, and on the other hand, with the support 5. The rapid-setting cement thus permits fixing the windings 10 to the support 5 in a quasi-instantaneous fashion. In the context of the invention, what is meant by rapid-setting cement is cyanoacrylate-based cements for example, or cements called "hot melt" based on polymers whose setting time is generally less than or equal to ten seconds. Use can also be made of slower-setting adhesives, such as silicone-based adhesives whose setting time can attain one or several hours. In the case of utilization of slow-setting adhesives such as silicone cements, it is desirable to make use of a provisional retaining element, such as a counter-support (not shown in the figures) which is positioned against the support 5, for example on the face opposite to the flange 5*a*, after a deposition of the silicone cement. The utilization of a counter-support permits disassociating the support 5 from the chuck 2, while the silicone cement has not yet acted definitively, without risking a displacement of the windings 10. On the industrial scale, each assembly formed by the support 5 and the counter-support can be deposited or stacked for purposes of drying in waiting stations in order to assure a continuous production of inductors. After drying of the silicone cement, the counter-support is withdrawn.

Figure 3:
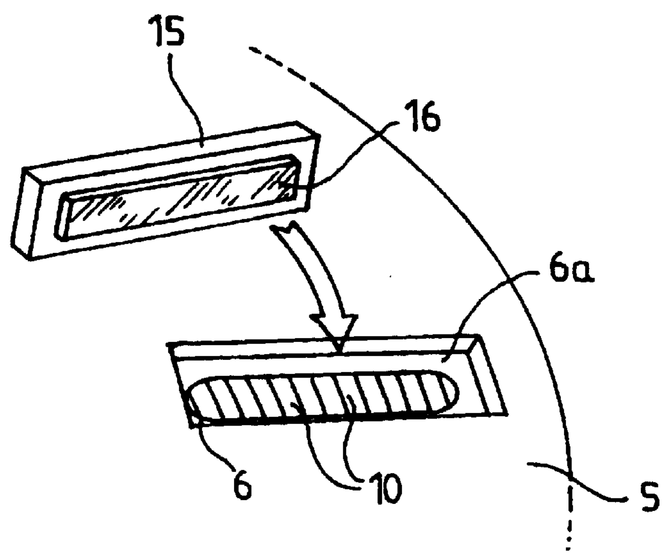
FIG. 3 represents a mounting detail of the process according to the invention.

According to a variant of the practice of the process according to the invention, this latter consists in utilizing ferrite elements 15 in association with cementing means in order to maintain the windings 10 on the support 5. Such a use is shown schematically for example in FIG. 3 where the ferrite elements 15, in, for example, rectangular form, present a double-face adhesive 16 cemented on one of the walls of the ferrite elements 15. The ferrite elements 15, preferably in a form conjugated to the openings 6, is then introduced into the openings 6 of the support 5 in a manner such that the double face adhesive 16 comes in contact with the part of the windings 10 found opposite the openings 6. The ferrite elements 15 are thus fixed with the windings 10. Advantageously the openings 6 present internal edges 6*a* to maintain the ferrite elements 15 by bearing on the edges 6*a* in the housing constituted by each opening 6. The windings 10 are thus not able to carry along the ferrite elements 15 through the openings 6. Finally, the assembly constituted of the support 5, the windings 10, the ferrite elements 15 associated with a double face adhesive 16 is a rigid and compact assembly which can be easily handled before an encapsulating operation.

A process according to the invention thus consists in utilizing at least one double face adhesive 16 as a cementing means. The windings 10, constituting for example a flat winding, can thus be utilized in any position or orientation in space on another mounting or fabrication line after separation of said windings 10 from the chuck 2. The fixing of the support 5 on the chuck 2 is effectuated by any known means.

The present invention is thus distinguished by the utilization of rapid-setting cementing means to fix the windings 10 of electric wires and coated with an electric insulating material with a support 5 on which are effectuated said windings 10 in a manner to realize an inductor for an induction source, easily handled, without undoing the windings 10.

Such a utilization consists in associating the ferrite elements 15 with cementing means. Utilization of cementing means according to the invention consists for example in utilizing a rapid-setting cement for fixing the windings 10 of the electrically conductive wires coated with an electrical insulation material with a support on which are effectuated the windings 10 in a manner to realize an inductor for a source of induction which is easily handled while maintaining the windings 10 in intimate connection. The utilization of such cementing means consists in performing a cementing operation with the aid of openings 6 arranged in the support 5 opposite the windings 10. In this manner the cementing means come directly in contact with at least one portion of the windings 10. It is obvious that the ferrite elements 15 can also be associated with rapid-setting cement according to the invention. This latter can, according to another variation of the process for fabricating an inductor according to the invention, be spread into the openings 6 without addition of a supplemental means. The ferrite elements 15 utilized serve essentially to channel the magnetic flux generated by the inductor but can advantageously be replaced by any solid element when there is not a technical necessity to utilize ferrite elements to channel the magnetic flux.

According to a supplemental variant of the process for fabricating an inductor according to the invention, the cementing means are constituted exclusively by a single-face adhesive which comes to be cemented against, on the one hand, a portion of the windings 10 accessible through the openings 6, and, on the other hand, on the internal edges 6*a* of the openings 6. A contact surface easily determinable by experimentation between the single-face adhesive utilized and the portion of the windings 10 coming in contact permits the attainment of a sufficient retention of the windings 10 on the support 5.

An advantage of the present invention resides in the utilization of a standard electric wire to produce the windings (10). Such a wire is not coated or covered with a thermoplastic material. Its cost is thus reduced and the process for fabrication of inductors is found to be simplified at the same time.

POSSIBILITIES OF INDUSTRIAL APPLICATION

The present invention finds its application in all types of induction equipment and in particular household appliances of the cooking surface type.

We claim:

1. Process for fabricating an inductor for induction sources comprising winding on a support (5) an electric conductor coated with an electrically insulating material to form windings and utilizing a resin to maintain the windings (10) in a compact form after an encapsulating operation, wherein said process further comprises utilizing a rapid-setting cementing means to maintain the windings (10) on the support (5) before the encapsulating operation, and wherein said step of utilizing comprises introducing the cementing means into openings (6) arranged in the support (5), said openings (6) permitting access to the windings (10).

2. Process according to claim 1 further comprising utilizing ferrite elements (15) in association with the cementing means to maintain the windings (10) on their support (5).

3. Process according to claim 1 wherein a rapid-setting cement is utilized as the cementing means.

4. Process according to claim 3 wherein the rapid-setting cement is a cyanoacrylate-based cement, or a hot melt cement, or a silicone-based cement.

5. Process for fabricating an inductor for induction sources comprising winding on a support (5) an electric conductor coated with an electrically insulating material to form windings and utilizing a resin to maintain the windings (10) in a compact form after an encapsulating operation, wherein said process further comprises utilizing a rapid-setting cementing means to maintain the windings (10) on the support (5) before the encapsulating operation, and wherein said step of utilizing comprises introducing a silicone-based cement into the opening (6), then positioning a counter-support on the support (5) to provisionally maintain the windings (10), and depositing each assembly constituted by the support (5) and the counter-support at a waiting station.

6. Process according to claim 1 wherein at least one adhesive band (16) is utilized as the cementing means.

7. Process according to claim 6 wherein the at least one adhesive band is a double-face adhesive band associated by one face with ferrite elements (15) and by the other face with the windings (10).

8. Process according to claim 2 wherein said step of utilizing a rapid-setting cementing means comprises applying the cementing means to the windings after said winding step.

9. Process according to claim 8 wherein the cementing means are applied to fix the windings to the support.

10. Process according to claim 2 wherein said step of utilizing a rapid-setting cementing means is carried out in order to cement the windings to the support.

11. Process according to claim 2 wherein the induction sources constitute elements of cooking surfaces.

* * * * *

UNITED STATES PATENT AND TRADEMARK OFFICE

CERTIFICATE OF CORRECTION

PATENT NO. : 6,038,760
DATED : March 21, 2000
INVENTOR(S) : Dominique ANTOINE; Dominique HANTZ It is certified that error appears in the above-identified patent and that said Letters Patent is hereby corrected as shown below:

On the Title Page, Item [30], delete "Jul. 29, 1997" and insert therefor --Jul. 29, 1994--

Signed and Sealed this

Fifth Day of June, 2001

*Attest:*

NICHOLAS P. GODICI

*Attesting Officer*

*Acting Director of the United States Patent and Trademark Office*